(12) United States Patent
Kremmel et al.

(10) Patent No.: US 12,708,246 B2
(45) Date of Patent: Aug. 18, 2026

(54) FILL FUNNEL HOSE INTERFACE

(71) Applicant: Haier US Appliance Solutions, Inc., Wilmington, DE (US)

(72) Inventors: Aldo Vincent Kremmel, Palmyra, IN (US); Logan Chayse Dunaway, Greenville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 89 days.

(21) Appl. No.: 18/775,910

(22) Filed: Jul. 17, 2024

(65) Prior Publication Data

US 2026/0020739 A1 Jan. 22, 2026

(51) Int. Cl.
*A47L 15/42* (2006.01)
*F16L 33/22* (2006.01)

(52) U.S. Cl.
CPC ......... *A47L 15/4217* (2013.01); *F16L 33/222* (2013.01)

(58) Field of Classification Search
CPC ........................... A47L 15/4217; F16L 33/222
USPC ....................................................... 134/56 D
See application file for complete search history.

(56) References Cited

U.S. PATENT DOCUMENTS 3,821,961 A * 7/1974 Schimke ............. A47L 15/4217 134/182
2001/0000576 A1* 5/2001 Robinson .............. B08B 9/0321 15/322
2021/0219810 A1 7/2021 Oznazli
2023/0079570 A1* 3/2023 Martinez ............. A47L 15/4418 134/94.1

FOREIGN PATENT DOCUMENTS

| | | | |
|---|---|---|---|
| CN | 109464107 | A | 3/2019 |
| DE | 102017114185 | A1 | 1/2018 |
| EP | 2586355 | B1 | 6/2014 |
| JP | 4253012 | B2 | 4/2009 |
| JP | 2010035677 | A | 2/2010 |

* cited by examiner

*Primary Examiner* — Tinsae B Ayalew
(74) *Attorney, Agent, or Firm* — Dority & Manning, P.A.

(57) ABSTRACT

A dishwashing appliance includes a tub, the tub includes a sidewall, the sidewall defines a fill hole. The dishwashing appliance further includes a fill funnel coupled with the sidewall of the tub positioned at the fill hole. The fill funnel defines an inlet. The fill funnel includes a hose connection feature disposed within the fill funnel adjacent to the inlet. The hose connection feature defines a primary flow path, the primary flow path is directed toward the fill hole. The fill funnel further includes a weep barrier positioned vertically beneath the hose connection feature. The weep barrier at least partially defines a secondary flow path directed toward the fill hole.

10 Claims, 6 Drawing Sheets

FILL FUNNEL HOSE INTERFACE

FIELD OF THE INVENTION

The present subject matter relates generally to fill funnels in dishwashing appliances and, more specifically, to systems for interfacing hoses with the fill funnels.

BACKGROUND OF THE INVENTION

Dishwashing appliances generally include a tub that defines a wash chamber. Rack assemblies can be mounted within the wash chamber of the tub for receipt of articles for washing. Multiple spray assemblies can be positioned within the wash chamber for applying or directing wash fluid (e.g., water, detergent, etc.) towards articles disposed within the rack assemblies in order to clean such articles. Dishwashing appliances are also typically equipped with one or more pumps, such as a circulation pump or a drain pump, for directing or motivating wash fluid from the wash chamber (e.g., to the spray assemblies or an area outside of the dishwashing appliance).

Generally, a fill funnel is mounted in the dishwashing appliance in order to supply water for the wash cycles. Unsecure hoses connected with fill funnels in dishwashing appliances can cause water leaks and spillage. A hose that properly secures with a fill funnel in the dishwashing appliance would be advantageous.

BRIEF DESCRIPTION OF THE INVENTION

Aspects and advantages of the invention will be set forth in part in the following description, or may be apparent from the description, or may be learned through practice of the invention.

In one example embodiment, a dishwashing appliance includes a tub, the tub includes a sidewall, the sidewall defines a fill hole. The dishwashing appliance further includes a fill funnel coupled with the sidewall of the tub positioned at the fill hole. The fill funnel defines an inlet. The fill funnel includes a hose connection feature disposed within the fill funnel adjacent to the inlet. The hose connection feature defines a primary flow path, the primary flow path is directed toward the fill hole. The hose connection feature further, at least partially, defines a secondary flow path directed toward the fill hole.

In another example embodiment, a fill funnel for a dishwashing appliance includes a tub defining a wash chamber for receipt of articles for washing. The tub defines a fill hole. The fill funnel includes a body coupled with an exterior of the tub. The body defining a body hole aligned with the fill hole. The fill funnel further includes a cap coupled with the body. The cap defines an inlet. The cap includes a hose connection feature disposed within the cap adjacent to the inlet. The hose connection feature defines a primary flow path directed toward the body hole. The cap further includes a weep barrier position vertically beneath the hose connection feature. The weep barrier at least partially defines a secondary flow path directed toward the body hole.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
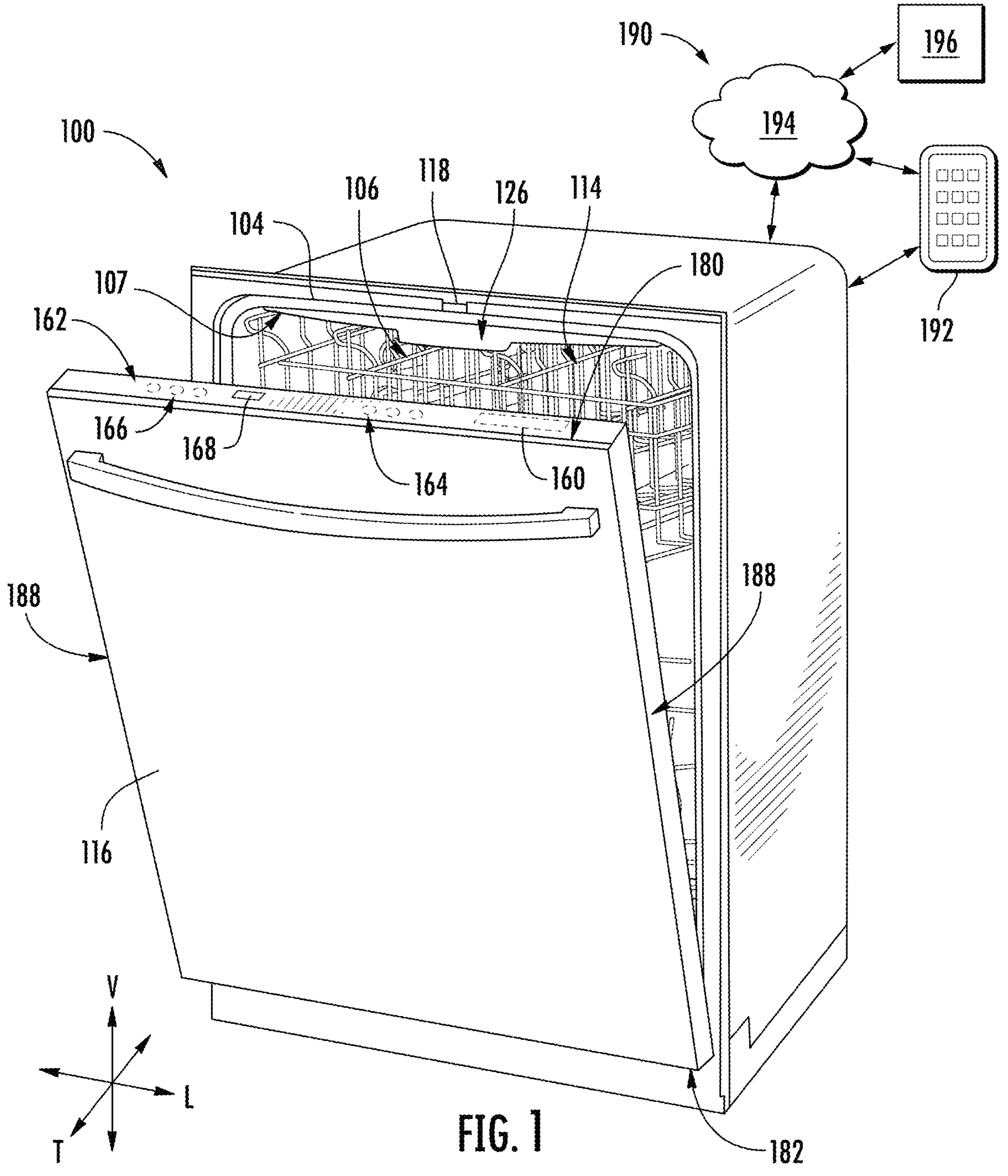
FIG. 1 provides a perspective view of an example embodiment of a dishwashing appliance of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, and/or a drain cycle. The term "wash fluid" refers to a liquid used for washing and/or rinsing the articles and is typically made up of water that may include other additives such as detergent or other treatments.

Figure 2:
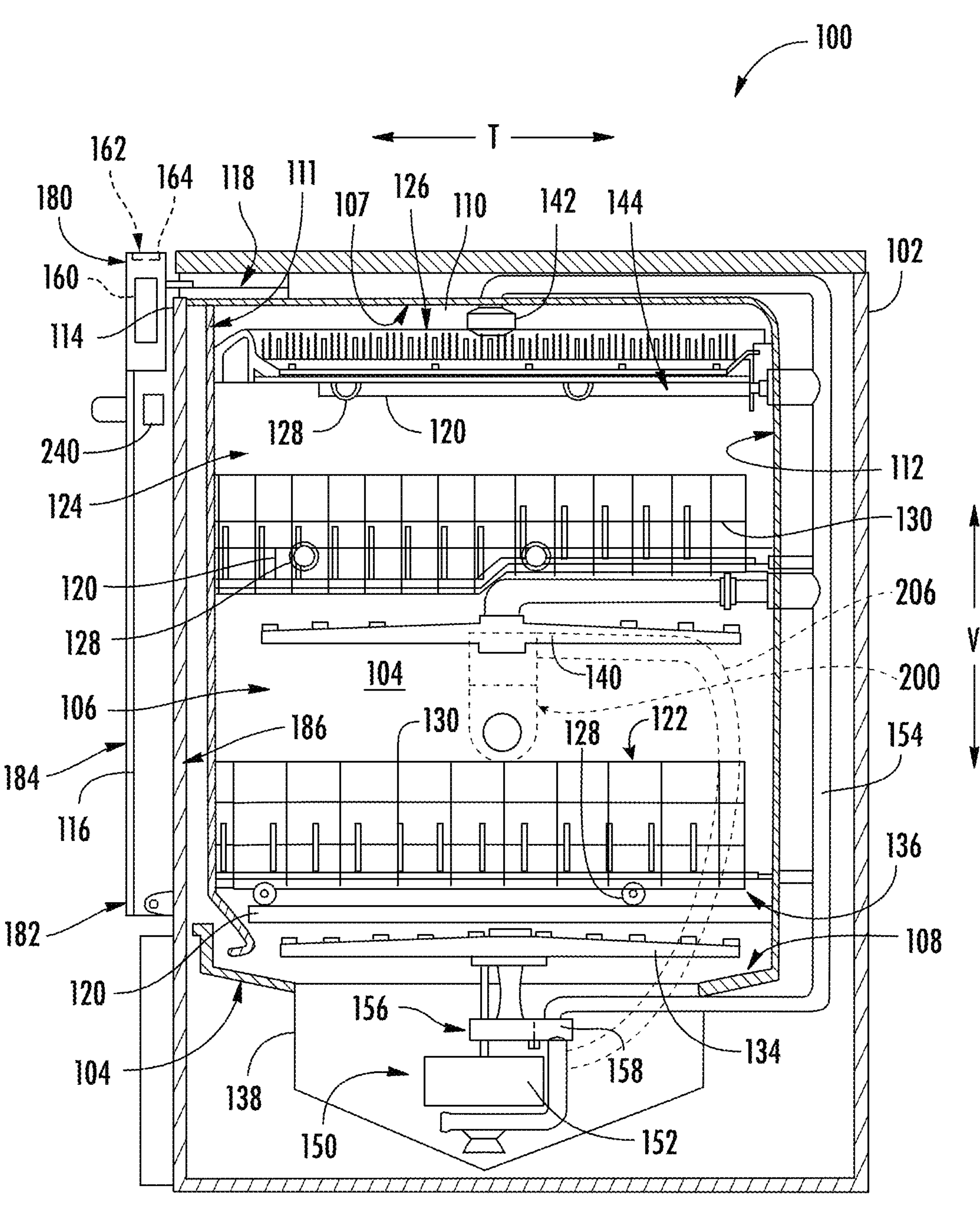
FIG. 2 provides a side, cross sectional view of the example dishwashing appliance of FIG. 1.

FIGS. 1 and 2 depict an example domestic dishwasher or dishwashing appliance 100 that may be configured in accordance with aspects of the present disclosure. For the particular embodiment of FIGS. 1 and 2, the dishwasher appliance 100 includes a cabinet 102 (FIG. 2) having a tub 104 therein that defines a wash chamber 106 for receipt of articles 94 for washing. As shown in FIG. 2, tub 104 extends between a top 107 and a bottom 108 along a vertical direction V, between a pair of opposing side walls 110 along a lateral direction L, and between a front side 111 and a rear side 112 along a transverse direction T. Each of the vertical direction V, lateral direction L, and transverse direction T are mutually perpendicular to one another.

In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

The tub 104 includes a front opening 114 and a door 116 hinged at its bottom 117 for movement between a normally closed vertical position (shown in FIG. 1), wherein the wash chamber 106 is sealed shut for washing operation, and a horizontal open position for loading and unloading of articles from the dishwasher appliance 100. According to example embodiments, dishwasher appliance 100 further includes a door closure mechanism or assembly 118 that is used to lock and unlock door 116 for accessing and sealing wash chamber 106.

At least one rack assembly is slidably positioned within wash chamber 106 and is configured for the receipt of articles for cleaning. For the example embodiment shown in FIG. 2, opposing tub sidewalls 110 accommodate a plurality of rack assemblies. More specifically, guide rails 120 may be mounted to (or formed as part of) sidewalls 110 for supporting a first rack assembly 122 (also referred to as a lower rack assembly 122), a middle rack assembly 124 (also referred to as a second rack assembly 124), and a third rack assembly 126 (also referred to as an upper rack assembly 126). As illustrated, upper rack assembly 126 is positioned at a top portion of wash chamber 106 above middle rack assembly 124, which is positioned above lower rack assembly 122 along the vertical direction V. Additional details regarding the upper rack assembly 126 will be provided herein. For this example embodiment, upper rack assembly 126 is supported on opposing sidewalls 110 by rails 120 but rails 120 could be supported on and attached to middle rack assembly 124 as well.

Each rack assembly 122, 124, 126 is adapted for movement along transverse direction T between an extended loading position (not shown) in which the rack is substantially positioned outside the wash chamber 106, and a retracted position (shown in FIGS. 1 and 2) in which the rack is located inside the wash chamber 106. This may be facilitated, for example, by rollers, or guide wheels 128 mounted onto rack assemblies 122, 124, 126, respectively. Although guide rails 120 and guide wheels 128 (also referred to as rollers) are illustrated herein as facilitating movement of the respective rack assemblies 122, 124, 126, it should be appreciated that any suitable sliding mechanism or member may be used according to alternative embodiments. In some embodiments, dishwasher appliance 100 may accommodate a different number of rack assemblies and supporting guide rails. For example, dishwasher appliance 100 may accommodate only first rack assembly 122 and upper rack assembly 126, with accompanying guide rails.

Some or all of the rack assemblies 122, 124, 126 may be fabricated into lattice, or grid, structures including a plurality of wires or elongated members 130 (for clarity of illustration, not all elongated members making up rack assemblies 122, 124, 126 are shown in FIG. 2). The plurality of wires or elongated members 130 may be either steel and stainless steel, and the wire may be coated with none, one, or more of nylon and polyvinyl chloride. Rack assemblies 122, 124, 126 are generally configured for guide rails 120 within wash chamber 106 while allowing a flow of wash fluid to reach and impinge on those articles, e.g., during a cleaning or rinsing cycle. For some embodiments, a silverware basket (not shown) is removably attached to a rack assembly, e.g., lower rack assembly 122, for placement of silverware, utensils, and the like, that are otherwise too small or delicate to be accommodated by rack 122.

At least one spray assembly is located in wash chamber 106 and is configured to direct wash fluids onto at least on rack assembly for washing articles located therein. For the example embodiment of FIG. 2, dishwasher appliance 100 further includes a plurality of spray assemblies for urging a flow of water or wash fluid onto the articles placed within wash chamber 106. More specifically, as illustrated in FIG. 2, dishwasher appliance 100 includes a first spray assembly 134 (also referred to as a lower spray arm assembly 134) disposed in a lower region 136 of wash chamber 106 and above a sump 158 so as to rotate in relatively close proximity to lower rack assembly 122. Similarly, a second spray assembly 140 (also referred to as a mid-level spray arm assembly 140) is located in an upper region 144 of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, an upper or third spray assembly 142 (also referred to as an upper spray assembly 142) may be located above upper or third rack assembly 126 along the vertical direction V. In this manner, third spray assembly 142 may be configured for urging and/or cascading a flow of wash fluid downward over rack assemblies 122, 124, and 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear side 112 of tub 104 along the vertical direction V to supply wash fluid throughout wash chamber 106. In some examples, a secondary supply conduit (not shown) may supply additional wash fluid to one or more various spray assemblies and manifolds.

As illustrated, primary supply conduit 154 is used to supply wash fluid to mid-level spray arm assembly 140. Diverter assembly 156 can allow selection between spray assemblies 134 and 140, 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary. Movement of the spray arm assemblies 134 and 140 and the spray from fixed manifolds like spray assembly 142 provides coverage of dishes, silverware, and other dishwasher contents to be cleaned with a washing spray. Other configurations of spray assemblies may be used as well. For example, dishwasher appliance 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156, e.g., which is positioned within sump 138 of dishwasher appliance. Diverter assembly 156 may include a diverter disk (not shown) disposed within a diverter chamber (not shown) for selectively distributing the wash fluid to the spray assemblies 134, 140, 142 and/or other spray manifolds or devices. For example, the diverter disk may have a plurality of apertures that are configured to align with one or more outlet ports (not shown) at the top of diverter chamber (not shown). In this manner, the diverter disk may be selectively rotated to provide wash fluid to the desired spray device.

According to an example embodiment, diverter assembly 156 is configured for selectively distributing the flow of wash fluid from pump 152 to various fluid supply conduits, only some of which (e.g., 154) are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counterclockwise direction, a third conduit for spraying rack assembly 126 (shown in FIG. 2) as a silverware rack, and a fourth conduit for supplying only mid-level and/or upper spray assemblies 140, 142. Other configurations of diverter assembly 156 and/or other components (e.g., valves) may be used to allow various choices in the operation of the spray assemblies 134, 140, and 142 during a cleaning cycle.

The dishwasher appliance 100 is further equipped with a controller 160 (FIG. 2) to regulate operation of the dishwasher appliance 100. Controller 160 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher appliance 100. In the illustrated embodiment, the controller 160 may be located within a control panel area 162 of door 116. In such an embodiment, input/output ("I/O") signals may be routed between the control system and various operational components of dishwasher appliance 100 along wiring harnesses that may be routed through the bottom of door 116. Typically, the controller 160 includes a user interface panel/controls 164 (FIG. 1) through which a user may select various operational features and modes and monitor progress of the dishwasher appliance 100. In one embodiment, the user interface 164 may represent a general purpose I/O ("GPIO") device or functional block. In one embodiment, the user interface 164 may include input components, such as one or more of a variety of electrical, mechanical, or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher appliance 100. The example embodiment depicted in FIGS. 1 and 2 is for illustrative purposes only. For example, different locations may be provided for user interface 164, different configurations, including providing one or more rack assemblies 122, 124, 126 and one or more spray assemblies 134, 140, 142, to dishwasher appliance 100 may be used, different configurations may be provided for rack assemblies 122, 124, 126, different spray assemblies 134, 140, 142 and spray manifold configurations may be used, and other differences may be applied while remaining within the scope of the present subject matter.

Figure 3:
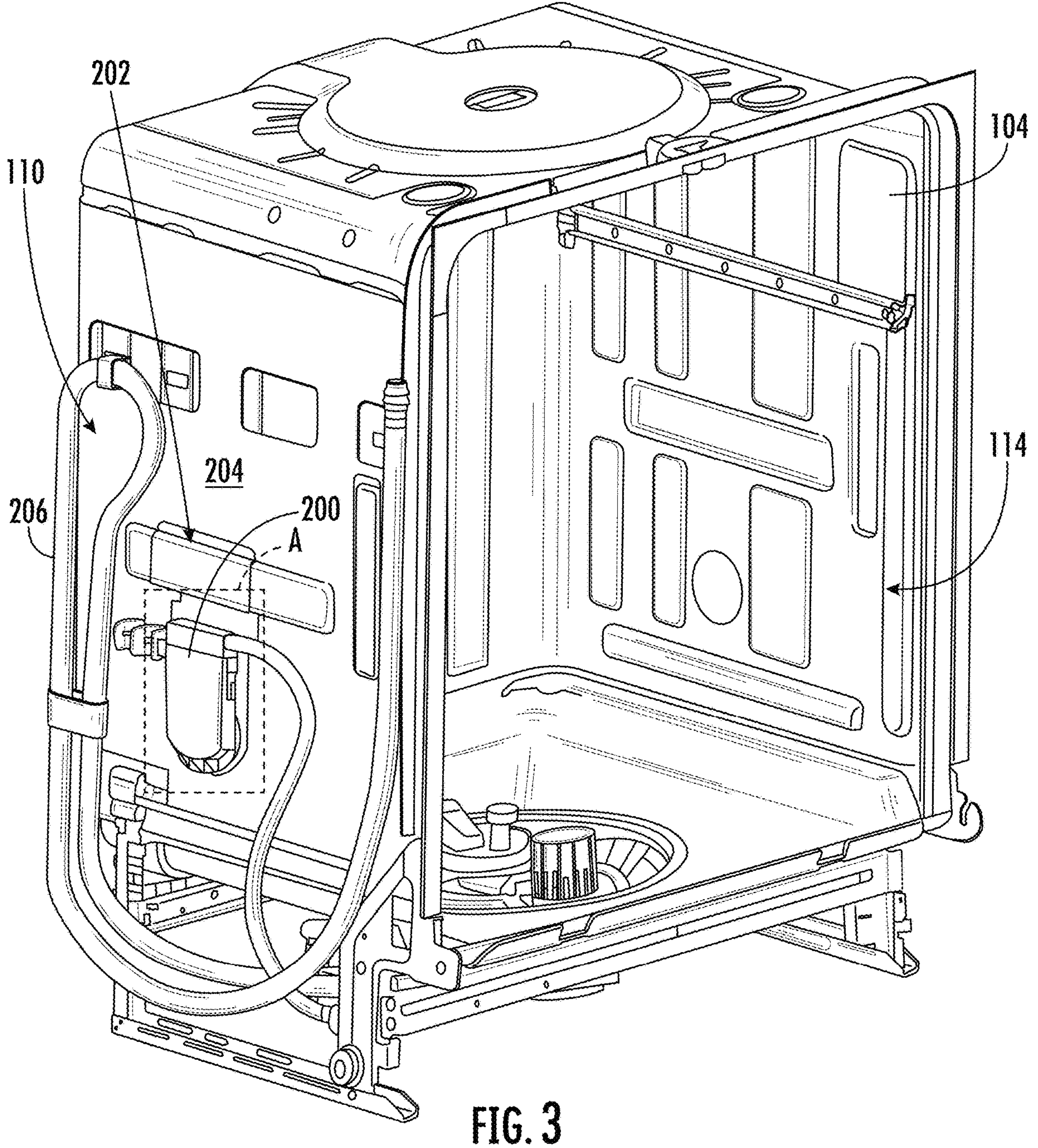
FIG. 3 provides a perspective view of a tub of an example embodiment of a dishwashing appliance according to aspects of the present disclosure.
Figure 4:
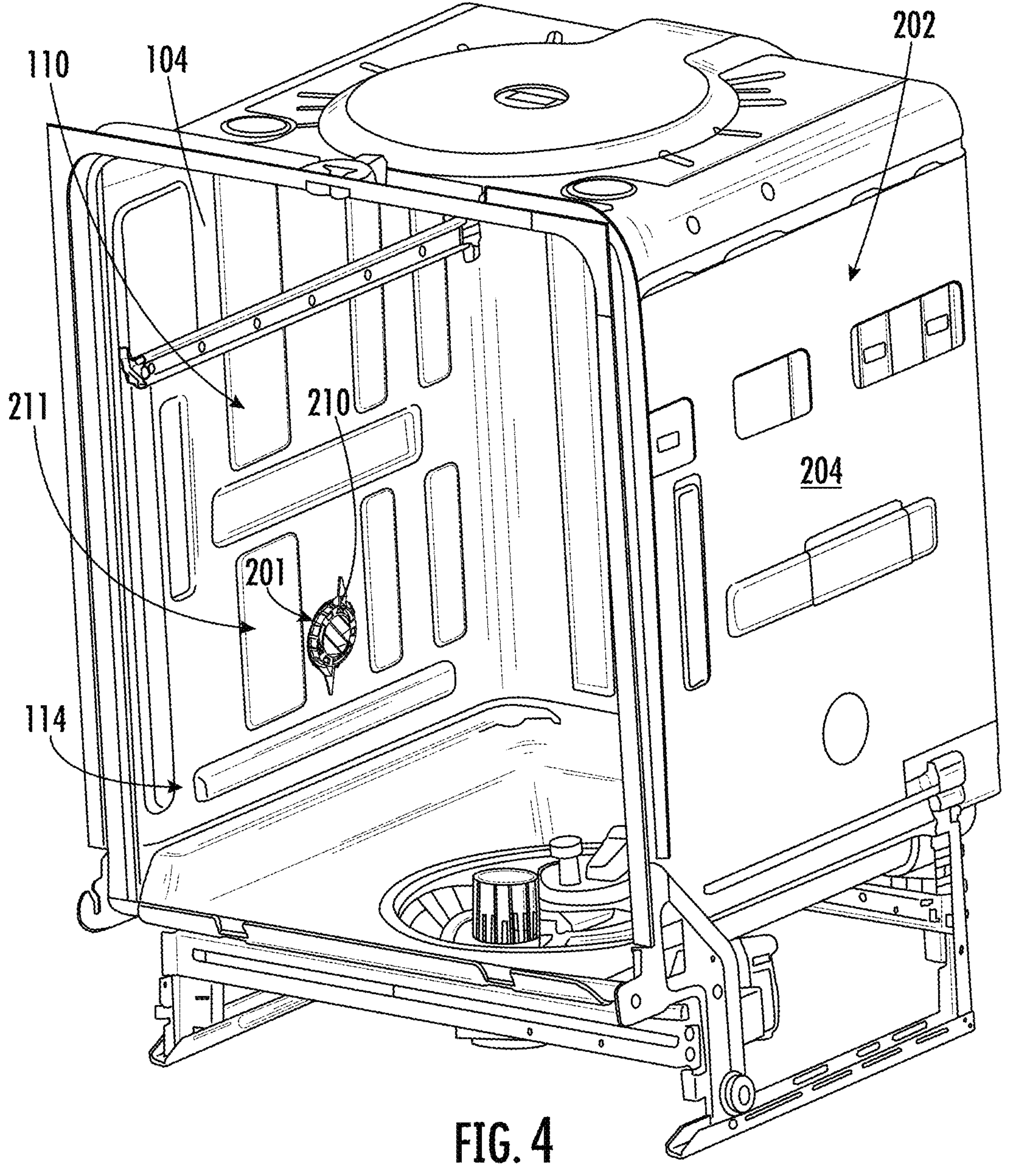
FIG. 4 provides a perspective view of an interior of the tub of FIG. 3 according to aspects of the present disclosure.

As may be generally seen in FIGS. 3 through 6, washing machine appliance 100 includes a fill funnel 200 generally configured for supplying tub 104 with water for use in the wash and/or rinse cycles. As seen in FIG. 3, fill funnel 200 may be positioned at an exterior portion 204 of tub 104 vertically beneath a protrusion 202. Specifically, as seen in FIG. 4, fill funnel 200 may be positioned on one of the pair of opposing sidewalls 110 at a fill hole 201. Fill funnel 200 may be secured to tub 104 via locking nut 210 at an interior portion 211.

Figure 5:
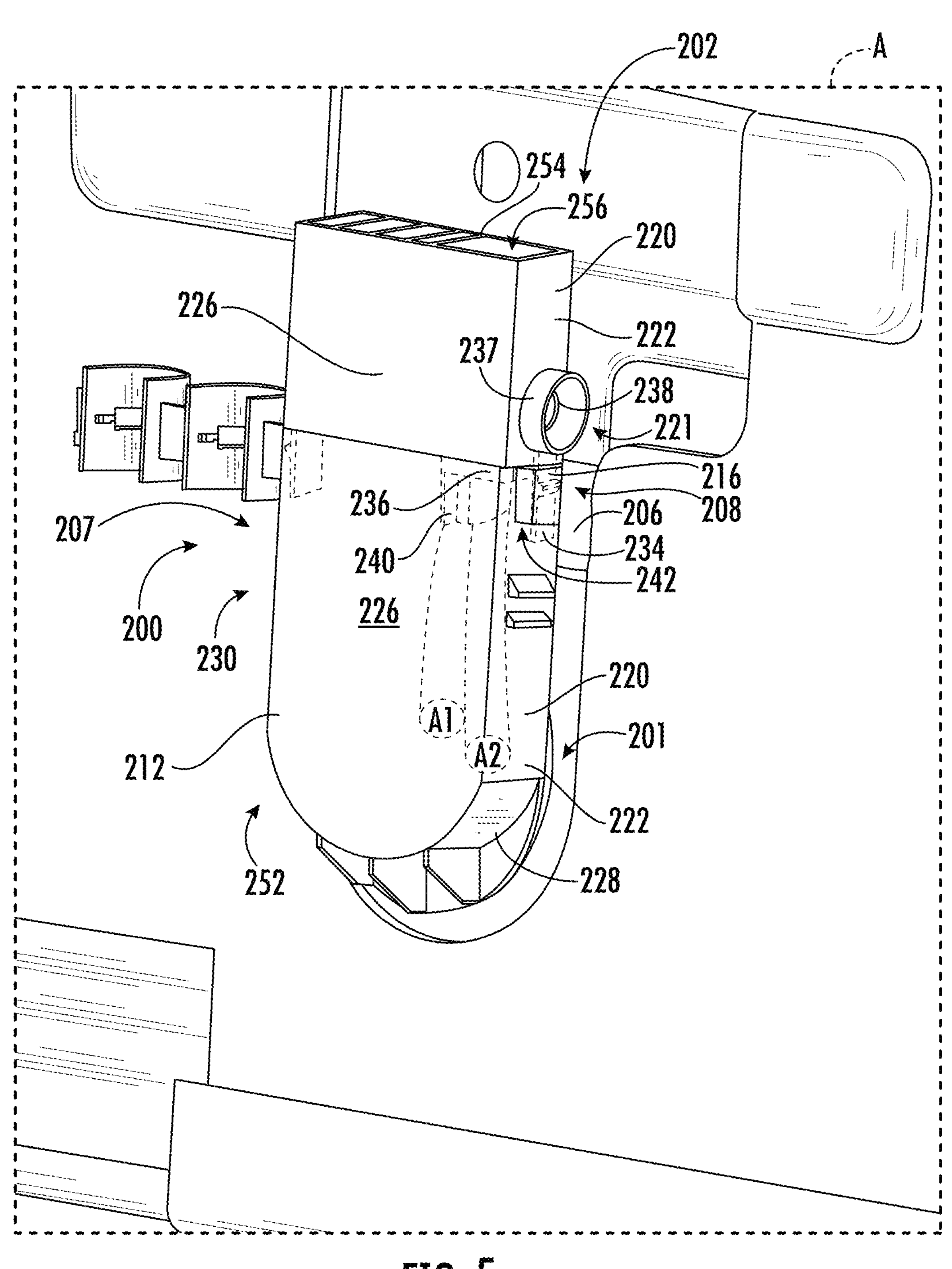
FIG. 5 provides a detailed view of a portion A of the tub of FIG. 3 according to aspects of the present disclosure.

FIG. 5 illustrates a portion A of FIG. 3 in greater detail. FIG. 5 generally illustrates the fill funnel 200 coupled with the exterior portion 204 with the sidewall 110 of the tub 104 located at the fill hole 201. In other words, the full funnel 200 is positioned outside of the wash chamber 106 at the fill hole 201. The fill funnel 200 may comprise a body 212. The fill funnel 200 may further comprise a cap 218 operably coupled with the body 212. The cap 218 may be coupled with the body 212 via at least one clip 234 and one clip receptacle 216, as further described below. As illustrated in the example embodiments of the figures the at least one clip 234 is coupled with the cap 218. The at least one clip receptacle 216 is coupled with the body 212. Additionally, or alternatively, the clip 234 and the clip receptacle 216 may be swapped between the cap 218 and the body 212.

As shown in the example embodiments of the figures, the body 212 and the cap 218 may extend in the lateral direction L in the transverse direction T similar distances, such that the cap 218 is sealed with the body 212. As shown in the example embodiments of the figures, the body 212 extends in the vertical direction V further than the cap 218 extends in the vertical direction V. Alternatively, the cap 218 and the body 212 may extend in the vertical direction a similar distance. Further, the cap 218 may extend in the vertical direction V further than the body 212 extends in the vertical direction V.

The fill funnel 200 comprises an exterior surface 207. The exterior surface 207 comprises a mating face 208 (not shown) positioned at the exterior portion 204 of the sidewall 110 of the tub 104. The mating face 208 may be defined by the cap 218 and/or the body 212. The mating face 208 may be engaged with the exterior portion 204 of the side wall 110 of the tub 104. The mating face 208 may be generally planar. Additionally, or alternatively, the mating face 208 may be complementary of the exterior portion 204 of the side wall 110 of the tub 104. In order to ensure that fill funnel 200 is properly secured to tub 104, locking nut 210 may compress the mating face 208 against tub 104.

The exterior surface 207 of the fill funnel 200 further comprises a first edge 220 coupled with the mating face 208. The first edge 220 may be defined by the cap 218 and/or the body 212. Additionally, or alternatively, the first edge 220 may be unitarily formed with the mating face 208. The first edge 220 may be generally planar. Additionally, or alternatively, the first edge 220 may be arcuate. Additionally, or alternatively, the first edge 220 may extend further in the vertical direction V than in the lateral direction L and the transverse direction T. The first edge to 220 may comprise a first portion 222 that is linear. The first edge 220 may further comprise a second portion 224 that is curved. The first portion 222 may be vertically above the second portion 224. Additionally, or alternatively, the first portion 222 may be referred to as a linear portion of the first edge 220. Additionally, or alternatively the second portion 224 may be referred to as a curved portion of the first edge 220.

The first edge 220 of the exterior surface 207 of the fill funnel 200 defines an inlet 221. The inlet 221 is defined by the cap 218 and/or the body 212. The fill funnel 200 further comprises a weep barrier 236 coupled with the first edge 220 beneath the inlet 221. As illustrated in the example embodiments of the figures, the weep barrier 236 may be unitarily formed with the first edge 220. As illustrated in the example embodiments of the figures the weep barrier 236 is coupled with the cap 218. Alternatively, the weep barrier 236 may be coupled with the body 212. The weep barrier 236, as illustrated, may also comprise a skirt 237 that extends circumferentially around the inlet 221. The weep barrier 236, as illustrated, may be unitarily formed with the first edge 220. The skirt 237 of the weep barrier 236 may protrude outwardly from the first edge 220. As illustrated in the example embodiments of the figures, the skirt 237 may be cylindrical. Additionally, or alternatively, the skirt 237 may be conical. Additionally, or alternatively, the skirt 237 may be generally prismatic. The weep barrier 236 is further described below. Additionally, the skirt 237 is also further described below.

The fill funnel 200 further comprises a hose connection feature 238. The hose connection feature 238 is positioned within the fill funnel 200 adjacent to the inlet 221. The hose connection feature 238 may be positioned at least partially within the skirt 237, such that the skirt 237 of the weep barrier 236 circumferentially surrounds the hose connection feature 238. The hose connection feature 238 is configured to couple with a hose 206. As illustrated in the example embodiments of the figures, the hose connection feature 238 is cylindrical. Additionally, or alternatively, the hose connection feature 238 may be generally prismatic or conical. The hose connection feature 238 is further described below.

The fill funnel 200 further comprises a free face 226 coupled with the first edge 220. Additionally, or alternatively, the free face 226 may be unitarily coupled with the first edge to 20. The free face 226 may be generally planar. Additionally, or alternatively, the free face 226 may be generally arcuate. The free face 226 may extend further in the transverse direction T compared to the first edge to 220.

The exterior surface 207 of the fill funnel 200 further comprises a second edge 228 coupled with the mating face 208 and the free face 226 and extends therebetween. The second edge 228 may comprise a third portion 230 that is linear. The second edge 228 may further comprise a fourth portion 232 that is curved. The third portion 230 may be vertically above the fourth portion 232. Additionally, or alternatively, the third portion 230 may be referred to as a linear portion of the second edge 228. Additionally, or alternatively the fourth portion 232 may be referred to as a curved portion of the second edge 228. The fourth portion 232 of the second edge 228 is coupled with the second portion 224 of the first edge 220. Additionally, or alternatively, the fourth portion 232 may be unitarily coupled with the second portion 224.

The fill funnel 200 may further comprise a primary fill funnel outlet 240 fluidly coupled with the hose connection feature 238. The primary fill funnel outlet 240 may be coupled with the cap 218, as illustrated. The primary fill funnel outlet 240 is further described below.

Figure 6:
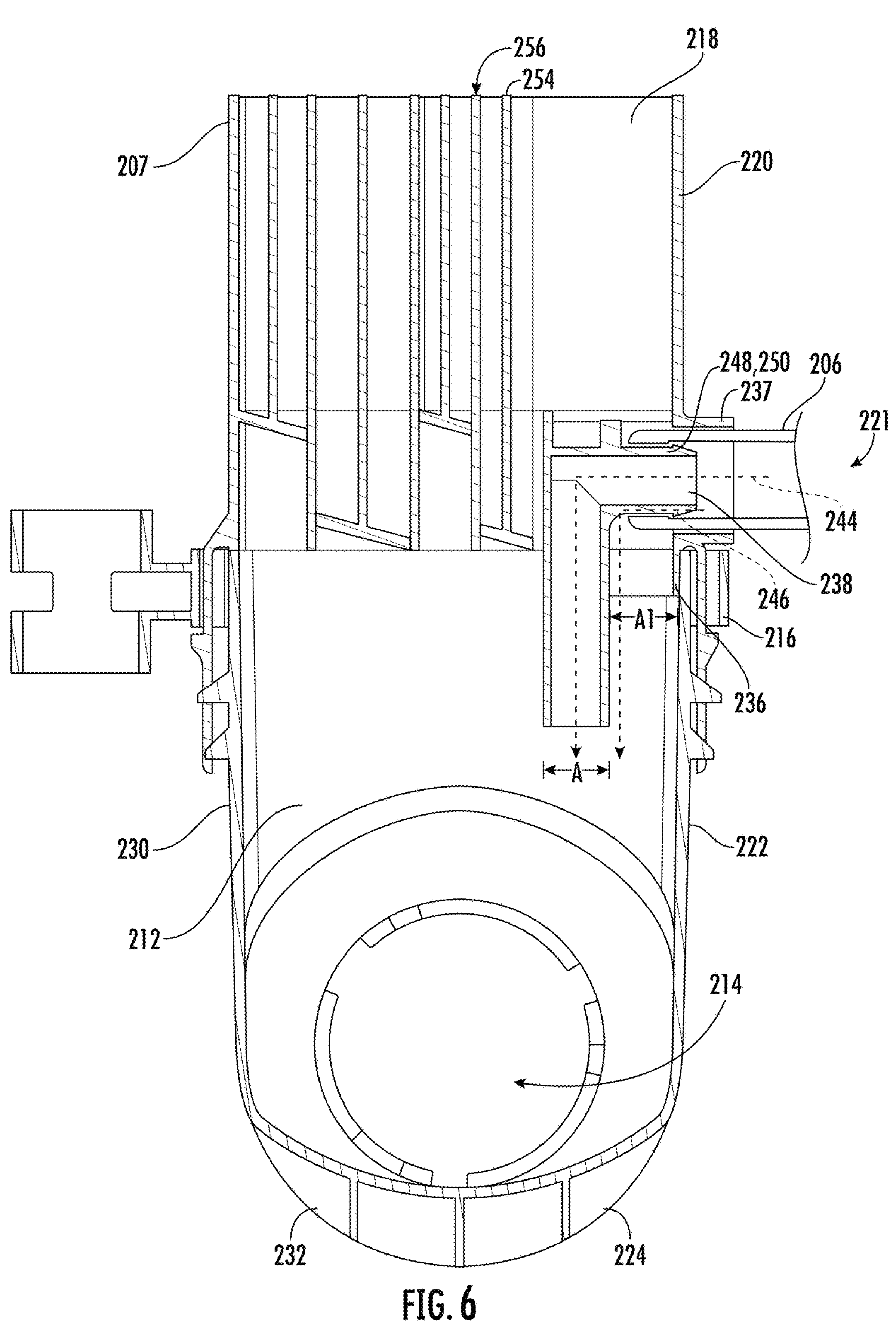
FIG. 6 provides a cross-sectional view of a fill funnel according to aspects of the present disclosure.

With regard to FIG. 6, a cross-sectional view of the fill funnel 200 is illustrated. The primary fill funnel outlet 240 is configured to deliver water from the hose 206 to the body 212. The fill funnel 200 further defines a body hole 214 fluidly coupled with the fill hole 201. The body hole 214 may to be defined by the body 212 as illustrated. Additionally, or alternatively, the cap 218 and/or the body 212 may define the body hole 214. The primary fill funnel outlet 240 directs water toward the body hole 214. As illustrated, a primary flow path 244 is at least partially defined by the hose 206, the hose connection feature 238, and the primary fill funnel outlet 240. For example, the hose 206 may primarily direct water toward the hose connection feature 238, and the hose connection feature 238 may primarily direct water toward the primary fill funnel outlet 240. The primary flow path 244 terminates at the body hole 214 to ultimately flow through the fill hole 201. Additionally, or alternatively, the primary flow path 244 may be generally inverted L-shaped. The primary fill funnel outlet 240, as illustrated, may be generally orthogonal to the hose connection feature 238. Further, the primary fill funnel outlet 240 defines a first cross-sectional area A1.

As shown in the example embodiments of the figures, the hose connection feature 238 comprises a barb 248. The barb 248 is configured to retain the hose 206 in connection with the hose connection feature 238. Additionally, or alternatively, the hose connection feature 238 is spaced from an interior periphery of the inlet 221 by a distance that is substantially equal to a thickness of the hose 206. Additionally, or alternatively, the hose connection feature 238 may comprise a thread 250 configured to permit the hose connection feature 238 to twistably couple with the hose 206.

The weep barrier 236 is configured to catch water that may leak from between the hose 206 and the hose connection feature 238. The fill funnel 200 further comprises a secondary fill funnel outlet 242 fluidly coupled with the weep barrier 236. As illustrated, the secondary fill funnel outlet 242 is generally orthogonal with the skirt 237 of the weep barrier 236. Further, the secondary fill funnel outlet 240 defines a second cross-sectional area A2. The second cross-sectional area A2 may be about twice as large as the first cross-sectional area A1. Additionally, or alternatively, the second cross-sectional area A2 may be about 90% larger than the first cross-sectional area A1. Additionally, or alternatively, the second cross-sectional area A2 may be about 80% larger than the first cross-sectional area A1. Additionally, or alternatively, the second cross-sectional area A2 may be about 70% larger than the first cross-sectional area A1. Additionally, or alternatively, the second cross-sectional area A2 may be about 60% larger than the first cross-sectional area A1. Additionally, or alternatively, the second cross-sectional area A2 may be about 50% larger than the first cross-sectional area A1. The secondary fill funnel outlet 242 may permit the secondary flow path 246 to direct a greater quantity of water compared to the primary flow path 244 of the primary fill funnel outlet 240.

The water that leaks between the hose 206 and the hose connection feature 238 that is caught by the skirt 237 is directed to the secondary fill funnel outlet 242. Additionally, or alternatively, the skirt 237 may circumferentially surround, or flushly engage, an exterior periphery of the hose 206. The secondary fill funnel outlet 242 directs the water that is caught by the weep barrier 236 toward the body 212. Further, the water that is directed toward the body 212 by the secondary fill funnel outlet 242 is directed toward the body hole 214 to ultimately flow through the fill hole 201. As illustrated, a secondary flow path 246 is at least partially defined by the hose 206, the hose connection feature 238, the weep barrier 236. The secondary flow path 246 may be further defined by the skirt 237 and the primary fill funnel outlet 240. The primary flow path 244 terminates at the body hole 214 and the fill hole 201.

In some cases, the hose 206 may be unsealed from the hose connection feature 238. Advantageously, the present disclosure allows for water that may leak from between the hose 206 and the hose connection feature 238 to flow directly to the body hole 214 through the fill hole 201. Because the second cross-sectional area A2 of the secondary fill funnel outlet 242 is larger than the first cross-sectional area A1 of the primary fill funnel outlet 240, the fill funnel 200 can handle extreme cases of weeping from between the hose 206 and the hose connection feature 238. For example, the fill funnel 200 may not overflow even if the water is exclusively directed through the secondary flow path 246. Additionally, the secondary flow path 246 is unimpeded between the hose connection feature 236 and the body hole 214, which allows for faster disbursement of water compared to an impeded flow path due to Bernoulli's principle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance comprising:

a tub defining a wash chamber for receipt of articles for washing, the tub comprising a sidewall, the sidewall defining a fill hole;

a fill funnel coupled with the sidewall of the tub, the fill funnel positioned outside of the wash chamber at the fill hole, the fill funnel defining an inlet, the fill funnel comprising:

a hose connection feature disposed within the fill funnel adjacent to the inlet, the hose connection feature defining a primary flow path, the primary flow path directed toward the fill hole, and wherein the hose connection feature at least partially defines a secondary flow path directed toward the fill hole; and a weep barrier including a skirt extending circumferentially around the hose connection feature, and wherein the skirt is configured to circumferentially surround the hose.

2. The dishwashing appliance of claim 1, wherein the secondary flow path is unimpeded between the hose connection feature and the fill hole.

3. The dishwashing appliance of claim 1, wherein the hose is fluidly coupled with the hose connection feature, wherein the hose primarily directs fluids into the hose connection feature.

4. The dishwashing appliance of claim 3, wherein the fill funnel further comprises:

a body coupled with the sidewall at the fill hole; and a cap operably coupled with the body, wherein the cap defines the inlet.

5. The dishwashing appliance of claim 4, wherein the cap further comprises:

an exterior surface;

at least one clip coupled with the exterior surface, wherein the at least one clip couples the cap with the body.

6. The dishwashing appliance of claim 5, further comprising the weep barrier extending circumferentially around the hose connection feature, and wherein the weep barrier outwardly protrudes from the exterior surface of the cap.

7. The dishwashing appliance of claim 6, wherein the weep barrier flushly engages an exterior periphery of the hose.

8. The dishwashing appliance of claim 3, wherein the hose connection feature is cylindrical, and wherein the hose connection feature comprises a plurality of threads to twistably couple the hose with the hose connection feature.

9. The dishwashing appliance of claim 3, wherein the hose connection feature is spaced from an interior periphery of the inlet by a distance that is substantially equal to a thickness of the hose.

10. The dishwashing appliance of claim 3, wherein the hose connection feature is barbed to retain the hose.

* * * * *